(12) United States Patent
Livneh

(10) Patent No.: US 9,184,593 B2
(45) Date of Patent: Nov. 10, 2015

(54) METHOD AND APPARATUS FOR STORING POWER FROM IRREGULAR AND POORLY CONTROLLED POWER SOURCES

(75) Inventor: Ben Zion Livneh, Denver, CO (US)

(73) Assignee: MicroCoal Inc., Aurora, CO (US)

( * ) Notice: Subject to any disclaimer, the term of this patent is extended or adjusted under 35 U.S.C. 154(b) by 548 days.

(21) Appl. No.: 13/407,563

(22) Filed: Feb. 28, 2012

(65) Prior Publication Data

US 2013/0221754 A1    Aug. 29, 2013

(51) Int. Cl.
*H02J 3/38* (2006.01)
*H02J 3/28* (2006.01)
*G05F 3/06* (2006.01)

(52) U.S. Cl.
CPC . *H02J 3/382* (2013.01); *H02J 3/28* (2013.01); *Y02E 70/30* (2013.01)

(58) Field of Classification Search
USPC ........................................................ 307/151
See application file for complete search history.

(56) References Cited

U.S. PATENT DOCUMENTS

| | | | |
|---|---|---|---|
| 3,555,232 A | 1/1971 | Bleackley |
| 3,631,673 A | 1/1972 | Charrier et al. |
| 3,849,662 A | 11/1974 | Blaskowski |
| 4,052,170 A | 10/1977 | Yan |
| 4,256,944 A | 3/1981 | Brandon |
| 4,259,560 A | 3/1981 | Rhodes |
| 4,280,033 A | 7/1981 | Wagener et al. |
| 4,285,140 A | 8/1981 | van Raam et al. |
| 4,370,534 A | 1/1983 | Brandon |
| 4,435,374 A | 3/1984 | Helm, Jr. |
| 4,466,362 A | 8/1984 | Maxwell |
| 4,475,922 A | 10/1984 | Rich |
| 4,488,952 A | 12/1984 | Soundararajan |
| 4,788,853 A | 12/1988 | Bell |
| 4,854,937 A | 8/1989 | Meyer et al. |
| 5,331,284 A | 7/1994 | Jean et al. |
| 5,335,425 A | 8/1994 | Tomizawa et al. |
| 5,393,311 A | 2/1995 | Marhanka |
| 5,455,516 A | 10/1995 | Jean et al. |
| 5,491,969 A | 2/1996 | Cohn et al. |
| 5,567,241 A | 10/1996 | Tsu et al. |
| 5,853,579 A | 12/1998 | Rummler et al. |
| 5,873,313 A | 2/1999 | Minami |
| 5,998,774 A | 12/1999 | Joines et al. |
| 6,039,774 A | 3/2000 | McMullen et al. |
| 6,087,642 A | 7/2000 | Joines |

(Continued)

FOREIGN PATENT DOCUMENTS

| | | |
|---|---|---|
| CN | 1914299 | 2/2007 |
| CN | 101014803 | 8/2007 |

(Continued)

OTHER PUBLICATIONS

T.P.R. de Jong, et al., "Coal Preparation", coal preparation research, http://www ta.tudeelft.nl/GV/local/CPP/CPPIndex.htm, pp. 1-5. Sep. 10, 2005.

(Continued)

*Primary Examiner* — Robert Deberadinis
(74) *Attorney, Agent, or Firm* — Chernoff Vilhauer McClung & Stenzel, LLP

(57) ABSTRACT

Embodiments of the present invention feature storing excess energy from solar, wind, wave, tidal and geothermal energy sources and combinations thereof in the form of upgraded fossil fuels.

29 Claims, 5 Drawing Sheets

(56) References Cited

U.S. PATENT DOCUMENTS

| | | |
|---|---|---|
| 6,109,097 A | 8/2000 | Conrads et al. |
| 6,121,594 A | 9/2000 | Joines et al. |
| 6,167,636 B1 | 1/2001 | Kepplinger |
| 6,265,702 B1 | 7/2001 | Drozd et al. |
| 6,398,921 B1 | 6/2002 | Moraski |
| 6,790,547 B2 | 9/2004 | Dieckmann et al. |
| 7,161,126 B2 | 1/2007 | Ripley |
| 7,270,842 B1 | 9/2007 | Lanier et al. |
| 7,666,235 B2 | 2/2010 | Learey et al. |
| 7,678,172 B2 | 3/2010 | Batterham et al. |
| 2007/0151147 A1 | 7/2004 | Learey et al. |
| 2005/0160667 A1 | 7/2005 | Weinberg et al. |
| 2005/0236403 A1 | 10/2005 | Kingman |
| 2007/0003459 A1 | 1/2007 | Stadlbauer et al. |
| 2007/0131591 A1 | 6/2007 | Pringle |
| 2007/0158174 A1 | 7/2007 | Livneh et al. |
| 2007/0295590 A1 | 12/2007 | Weinberg et al. |
| 2008/0048452 A1 | 2/2008 | Wobben |
| 2008/0087135 A1 | 4/2008 | Hwang et al. |
| 2008/0179177 A1 | 7/2008 | Cha |
| 2008/0197013 A1 | 8/2008 | Cha |
| 2009/0038213 A1 | 2/2009 | Weinberg et al. |
| 2010/0138062 A1 | 6/2010 | Zheng et al. |
| 2011/0146544 A1 | 6/2011 | Yaniv et al. |
| 2014/0217739 A1 * | 8/2014 | Morgan et al. .......... 290/54 |

FOREIGN PATENT DOCUMENTS

| | | |
|---|---|---|
| DE | 2907886 | 9/1980 |
| DE | 10006613 | 11/2001 |
| EP | 0252171 | 1/1988 |
| FR | 2378088 | 8/1978 |
| JP | 54-127901 | 10/1979 |
| JP | 59049292 | 3/1984 |
| JP | 5240061 | 9/1993 |
| JP | 09040980 | 2/1997 |
| JP | 09176656 | 7/1997 |
| JP | 10-331609 | 12/1998 |
| JP | 2000-319672 | 11/2000 |
| WO | 9707185 | 2/1997 |
| WO | 2006013551 | 2/2006 |
| WO | WO 2006013551 A1 * | 2/2006 |
| WO | 2009010956 | 1/2009 |
| WO | 2008155775 | 2/2009 |
| WO | 2009153796 | 12/2009 |
| WO | 2013112993 | 8/2013 |
| WO | 2013130558 | 9/2013 |

OTHER PUBLICATIONS

Sui Jian-cai et al., "Factors Influencing Conversion of Pyritic Sulfur in Coal by Microwave Irradiation", Journal of China University of Mining & Technology (English Edition) vol. 15, No. 1, 1 page, (2005).

Uslu, T. et al., "Effect of microwave heating on magnetic separation of pyrite", Colloids and Surfaces A: Physicochem Eng. Aspects 225, pp. 161-167, (2003).

Weng S., "Mossbauer analysis of the microwave desulfurization process of raw coal", J. Appl. Phys. 73(9), pp. 4680-4682, (May 1, 1993).

Donnelly, J., "Potential Revival of Dry Cleaning of Coal", The Australian Coal Review, 7 pages, (1999).

Marland, S. et al., "Microwave embrittlement and desulphurization of coal", Acta Montanistica Slovaca, pp. 351-355, (1998).

Chanice et al., "Microwave dry for Coal Powder", Coal Preparation Technology, Apr. 30, 1988, p. 52-53.

Zhoa et al, "Application of Microwave Power in Coal Processing", Coal Conversion, Nov. 30, 1993, p. 35-40.

\* cited by examiner

METHOD AND APPARATUS FOR STORING POWER FROM IRREGULAR AND POORLY CONTROLLED POWER SOURCES

STATEMENT REGARDING FEDERAL SUPPORT

Embodiments of the present invention were conceived and reduced to practice without Federal funding or support.

FIELD OF THE INVENTION

The present invention is directed to means for storing energy derived from irregular and poorly controlled power sources such as solar, wind, wave, tidal, and geothermal power and the like.

BACKGROUND OF THE INVENTION

Incorporation of "green" power sources such as solar, wind, wave, tidal, and geothermal energy sources have been difficult in part because many of these sources can not be synchronized to match power demands, or the source is variable in output, or the source output is irregular and random, or the source can die off or start up intermittently without prior warning. For example, the output of a single wind powered generator may fluctuate during the day due to prevailing wind patterns or local weather conditions. There is only so much wind at a particular location. Solar panels may be influenced by weather, such as overcast conditions, and are cyclical with the sun.

The demand for electric power also tends to be cyclical. However, weather conditions and customers' domestic, commercial and industrial usage influences demand over time cycles, such as the time of day, day of the week or season. A constant power source such as a geothermal energy source may have difficulty to ramp up further output unless the geothermal energy source is greatly overbuilt.

There is a need for embedding these irregular and poorly controlled power sources into the power grid without impairing the ability of consumers and industry to acquire needed electrical power in a cost efficient manner.

SUMMARY OF THE INVENTION

Embodiments of the present invention feature storing excess energy from irregular and poorly controlled electric power sources in the form of upgraded fossil fuels. As used herein, the term "irregular and poorly controlled power sources" refers to solar, wind, wave, tidal, and geothermal energy sources and combinations thereof, which comprise at least one aspect of either irregularity or poor control, or both.

One embodiment is directed to a method of storing energy in an electric power grid having a fossil fuel plant and an irregular and poorly controlled electric power source for generating electric power, and users capable of consuming said electric power. The fossil fuel plant is operable on low grade fossil fuel and high grade fossil fuel. The high grade fossil fuel has more energy per unit of mass than the low grade fossil fuel. The fossil fuel plant is capable of variable output having high output and low output and consuming variable amounts of fossil fuel over time. The irregular and poorly controlled electric power source has periods in which output does not correspond to demand and therefore is unusable. The method comprises the step of operating the irregular and poorly controlled electric power source to create one or more periods of excess energy in which the irregular and poorly controlled electric power source produces more power than demand, and one or more periods of deficit energy when the irregular and poorly controlled electric power source does not produce enough power to meet demand. The method further comprises the step of using the excess energy to power fossil fuel upgrading apparatus to process low grade fossil fuel and create a higher grade fossil fuel, and storing the higher grade fossil fuel with greater energy per unit of mass than the low grade fossil fuel. The method further comprises the step of operating the fossil fuel plant on high grade fossil fuel during the period of deficit energy to allow the fossil fuel plant to utilize stored energy from the variable electric power source in the higher grade fossil fuel.

Embodiments of the present method allow fossil fuel plants to operate at a substantially efficient level on the stored energy in the higher grade fossil fuel during periods of high demand. Thus, irregular and poorly controlled power sources can have a greater benefit to the public by reducing emissions. Embodiments of the present invention allow for the continued use of existing fossil fuel power sources in an environmentally advantageous manner, while at the same time ensuring better utilization and balance of power generation by irregular and poorly controlled power sources.

One embodiment of the present method features low grade fossil fuel processed by electromagnetic radiation to produce a higher grade fossil fuel. One form of electromagnetic radiation is microwave radiation. Low grade solid fossil fuel is transformed into a higher grade solid fossil fuel by removing water. One method features removal of at least eight percent of the water held in the fossil fuel. Low grade solid fossil fuel is selected from one or more of the group consisting of peat, low rank coal, ranks in between low rank coal and high rank coal, oil shale, and tar sand. A coal rated as a high rank coal can be processed to form a higher grade solid fossil fuel.

In addition or as an alternative, the low grade solid fossil fuel is processed by drying, for example with hot gases. One embodiment of the present method features said processing to the higher grade fossil fuel that removes one or more impurities. Examples of impurities include, without limitation, sulfur, ash, iron, and mercury.

One embodiment of the invention features a step of storing that creates a reserve of higher grade fossil fuel in an amount to allow the fossil fuel plant to substantially continue at an efficient level of operation during the period of deficit power on the higher grade fossil fuel. Periods of excess power and periods of deficit power are often cyclical, often over a day. During the deficit periods, the process of upgrading the fossil fuel stops. One method features a reserve sized to at least one of the amount of higher grade fossil fuel selected from the group consisting of the amount anticipated to be produced during the period of excess power or the amount anticipated to be used during the period of deficit power.

One embodiment of the present invention features a reserve maintained in a container. The container maintains the higher grade fossil fuel in a substantially dry condition prior to use. The container is preferably equipped with purging gases or inert gases to minimize premature combustion.

A further embodiment of the present invention is directed to an apparatus for generating electrical power for a power grid having periods of low demand and periods of high demand. The term "apparatus" in this context is meant to comprise a large industrial plant or plants and/or site or sites in which the parts are linked to a grid. The apparatus in this sense can occupy a large geographical area or separate sites removed from each other by substantial distances. The apparatus comprises an irregular and poorly controlled electric power source and a fossil fuel electric power source.

The irregular and poorly controlled electric power source has periods in which output does not correspond to demand, in which the demand exceeds capacity creating deficit periods and periods of capacity exceeding demand creating excess periods. The irregular and poorly controlled electric power source is in electrical communication with the power grid and, through the power grid or by separate transmission means, with the fossil fuel power source. The fossil fuel power source is in electrical communication with the power grid and, through the power grid or by separate transmission means, is in electrical communication with the irregular and poorly controlled electrical power source.

The fossil fuel electrical power source has a conveying system, a fossil fuel upgrading assembly, a burner, a generator, a source of lower grade fossil fuel, and a reserve. The source of lower grade fossil fuel is in communication with a conveying system. The conveying system is for receiving the lower grade fossil fuel from the source and at least one higher grade fossil fuel from a reserve or a fossil fuel upgrading assembly, and transporting the lower grade fossil fuel and higher grade fossil fuel to the burner. The fossil fuel upgrading system uses power and receives a lower grade fossil fuel from the source and produces a higher grade fossil fuel, which upgraded fossil fuel is directed to the reserve or conveying means. A burner in communication with the conveying system consumes the lower grade fossil fuel and/or the higher grade fossil fuel, powering the generator. The generator produces power for the power grid.

The power from the irregular and poorly controlled electric power source, during excess periods, is used by the fossil fuel upgrading assembly to store excess power in the form of an upgraded fossil fuel and the upgraded fossil fuel is used, during deficit periods, to produce power.

One embodiment of the apparatus features a reserve sized to at least one of the amount of higher grade fossil fuel selected from the group consisting of the amount anticipated to be produced during the excess periods or the amount anticipated to be used during the deficit periods. The reserve receives the higher grade fossil fuel during excess periods and releases the higher grade fossil fuel to the conveying system during deficit periods to allow the burner and generator to operate in an efficient mode of operation. Power grids and irregular and poorly controlled electric power sources can exhibit cyclical excess periods and deficit periods over a period of time, usually a day.

One embodiment of the apparatus features a reserve in the form of a container. The container is purged or maintained with inert gases to prevent ignition.

The fossil fuel upgrading assembly with respect to solid fossil fuels performs one or more of the group of upgrades consisting of size reduction, drying, and removal of impurities. For example, without limitation, one apparatus features fossil fuel upgrading facilities comprising electromagnetic radiation, such as microwave radiation. The microwave radiation is used to remove water and impurities.

One embodiment of the present apparatus further comprises control systems to monitor demand and output of the irregular and poorly controlled electric power source to facilitate the integration and control of the mode of operation.

One further embodiment of the present invention features a control system in signal communication with the irregular and poorly controlled power source, the power grid and the fossil fuel upgrading assembly. The control system receives data from the power grid as to demand and data from the irregular and poorly controlled power source as to output and compares the demand and output to make a determination as to at least one of the following: whether a excess period or deficit period is present, about to occur, or ending.

Preferably, the determination is provided to operators of one or more of the irregular and poorly controlled power source, power grid and fossil fuel upgrading assembly as a notice to maintain operation of the fossil fuel upgrading assembly, switch to alternative power supplies, cease operation, or begin or prepare to begin operation of the fossil fuel upgrading assembly.

In the alternative, or in addition to the above, the control system shifts excess power from the irregular and poorly controlled power source to the fossil fuel upgrading assembly during excess periods. In the alternative, or in addition to the above, the control system is in signal communication with the conveying system and reserve to use upgraded fossil fuel during deficit periods.

As used above, the term "signal communication" denotes the ability to send data and/or commands. The term includes, by way of example, without limitation, wire transmission, electromagnetic radio wave transmission such as WIFI, optical transmission, and cellular telecommunication.

The control system comprises computer processing units (CPUs) and memory and programming in the form of one or more computers, servers, and portable computing devices such as laptop computers, which are separate and distinct from other units and elements of the present apparatus or are integral therewith.

These and other features and advantages will be apparent to those skilled in the art upon viewing the drawings and reading the detailed description that follows.

DETAILED DESCRIPTION OF THE INVENTION

Embodiments of the present invention are directed to methods and apparatus for storing power from irregular and poorly controlled power sources. The description that follows describes embodiments which are understood by the inventor to be the best mode of practicing the invention. However, the present invention is subject to modification and alteration and the inventor's contemplation of the best mode may change over time. Thus, the present description is exemplary and should not be considered limiting.

Figure 1:
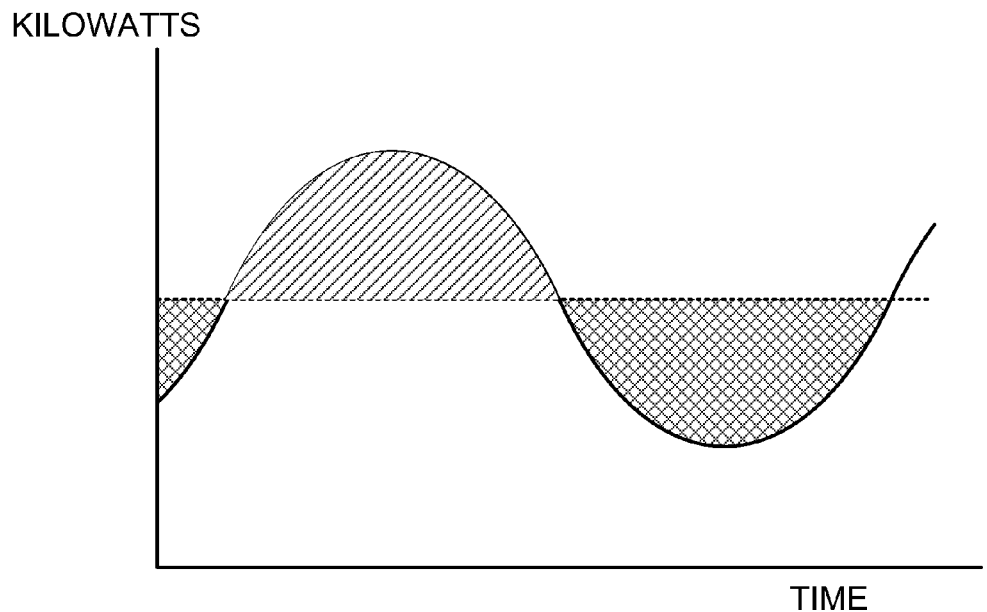
FIG. 1 depicts excess periods and deficit periods.

Irregular and poorly controlled electric power sources are characterized by the ultimate power source being limited in a particular time period. For example, only so much wind is available in a particular location, and only so many photons fall in a particular location, in a period of time. FIG. 1 depicts output of a geothermal electric power source in dotted lines over time. The output of the geothermal plant, represented by the dotted line, is substantially constant and can not adjust to additional power demands, represented by the solid line, creating periods of energy excess in crossed line hatching and periods of energy deficit in line hatching. One could build geothermal plants with great over capacity to handle the peak demand periods; however, such construction may not be technically feasible or may not be cost effective.

Figure 2:
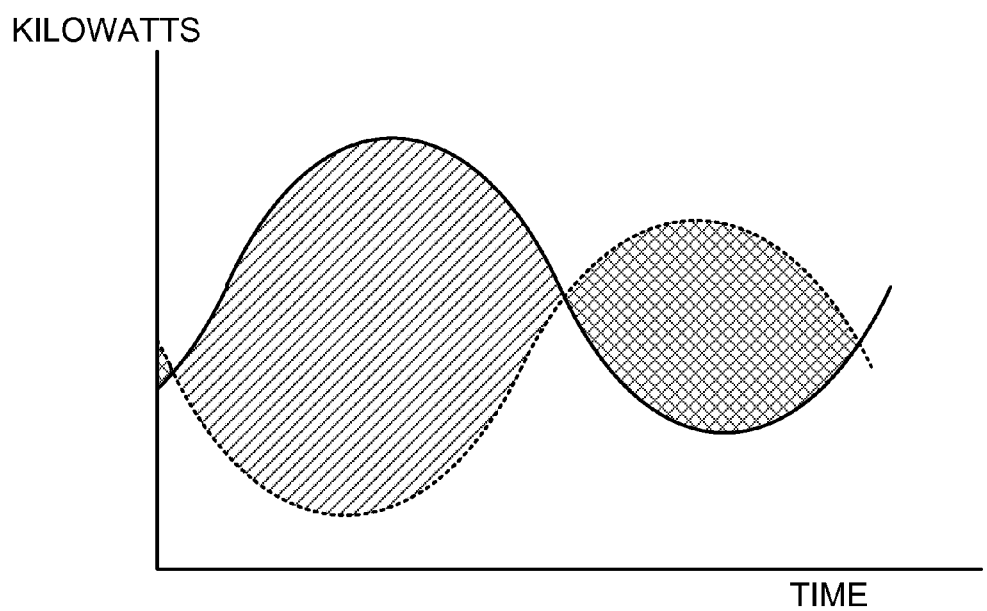
FIG. 2 depicts excess periods and deficit periods.

FIG. 2 depicts output of a wind powered generator in a dotted line with respect to demand over time in a solid line. Despite efforts to place wind generators in places of relatively constant wind, weather patterns do not necessarily cooperate and the power generation of wind generators tend to have periods of maximum output and low output as winds shift throughout the day. The output does not necessarily correlate with demand, creating periods of energy excess in crossed line hatching and periods of energy deficit in line hatching.

Utilities normally deal with the randomness of the output of irregular and poorly controlled power sources by operating standby sources, typically driven by fossil fuels, which are switched on when power output of those irregular and poorly controlled sources is lost, and switched off when power output of those sources is restored. This strategy is expensive, and causes more rapid wear and tear of the capital intensive equipment. It also defeats the original purpose of "green" power sources, that is, the elimination of carbon emission.

Electricity that is generated by irregular and poorly controlled power sources during low demand periods may be wasted due to the lack of consumers, and can not be used to substitute electricity generated by more "dirty" power sources such as fossil fuels. This makes "green" energy sources limited in their capacity to substitute power sources with large carbon footprints, and hence are suboptimal both economically and environmentally. Due to their nature, irregular and poorly controlled power sources have a very low utilization. For example, according to the Energy Information Administration (EIA), an agency of the Department of Energy (DOE), the total wind capacity in 2009 was 34,296 MW, which accounted for 73,886,132 kWh, representing a capacity factor (being the amount of power generated versus the amount of power that could be generated if operated 24/7) of 24.6%. This poor capacity factor represents in part the fact that wind is not always available, but is also partly due to the fact that power that is generated during low demand periods is not needed and is therefore wasted.

Figure 3:
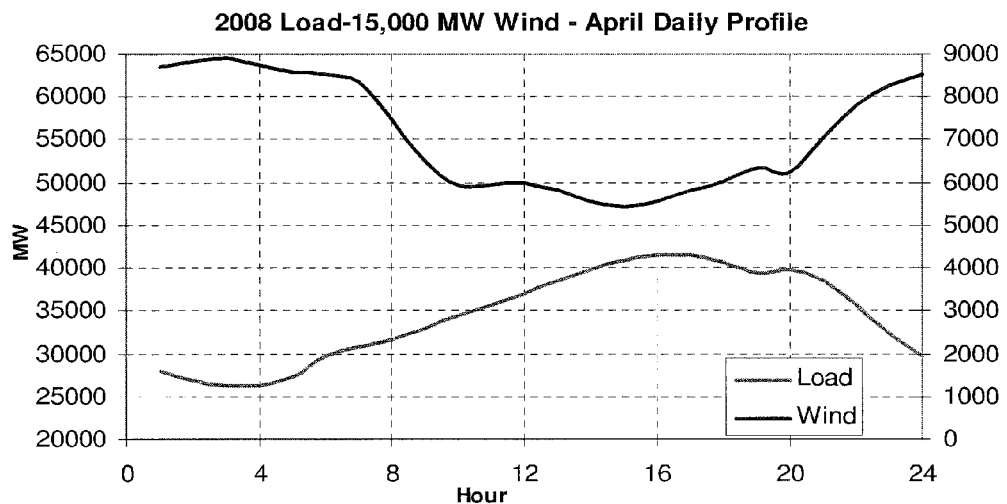
FIG. 3 depicts load and wind for a twenty-four hour period in April of 2008.
Figure 4:
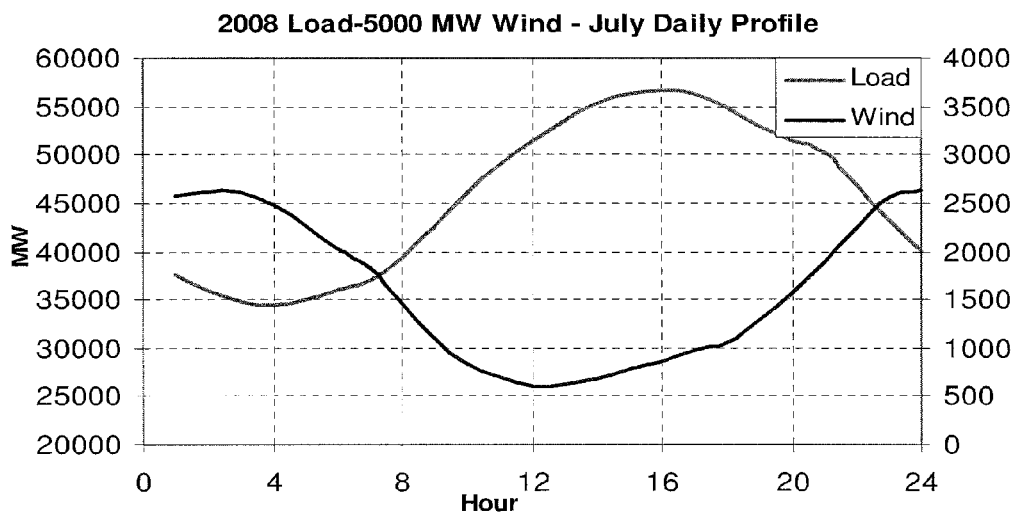
FIG. 4 depicts load and wind for a twenty-four hour period in July of 2008.

The irregular nature of wind-derived power is highlighted in FIGS. 3 through 7. FIG. 3 is a graphical representation of wind in megawatts represented in the dark solid line versus demand represented in the solid gray line, over a twenty-four hour period in April of 2008. For comparison, FIG. 4 is a graphical representation of wind in megawatts represented in the dark solid line versus demand represented in the solid gray line, over a twenty-four hour period in July of 2008.

Figure 5:
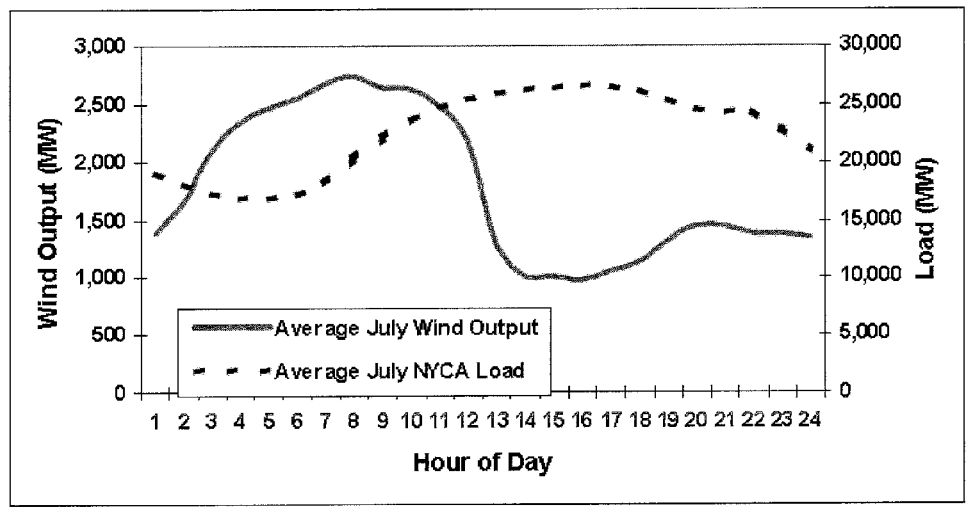
FIG. 5 depicts average hourly output for all wind sites and the New York Control Area average load for a month of July.
Figure 6:
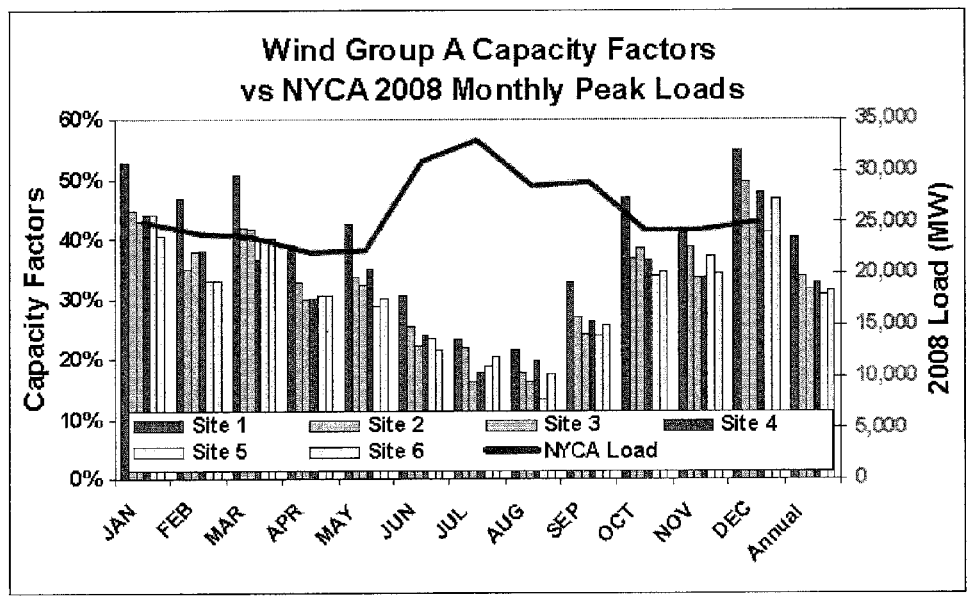
FIG. 6 depicts wind capacity versus the New York Control Area average 2008 monthly peak loads.

FIG. 5 graphically represents the average hourly wind output, in a solid line, against the New York Control Area average load, in a dashed line, for a month of July. FIG. 6 depicts the wind capacity factors, in bar form, and the New York Control Area average monthly peak loads for 2008, in a solid line. These data suggest that wind power is cyclic not only on a daily basis but on an annual basis as well. Summer is a high demand period when wind power is at its lowest.

Figure 7:
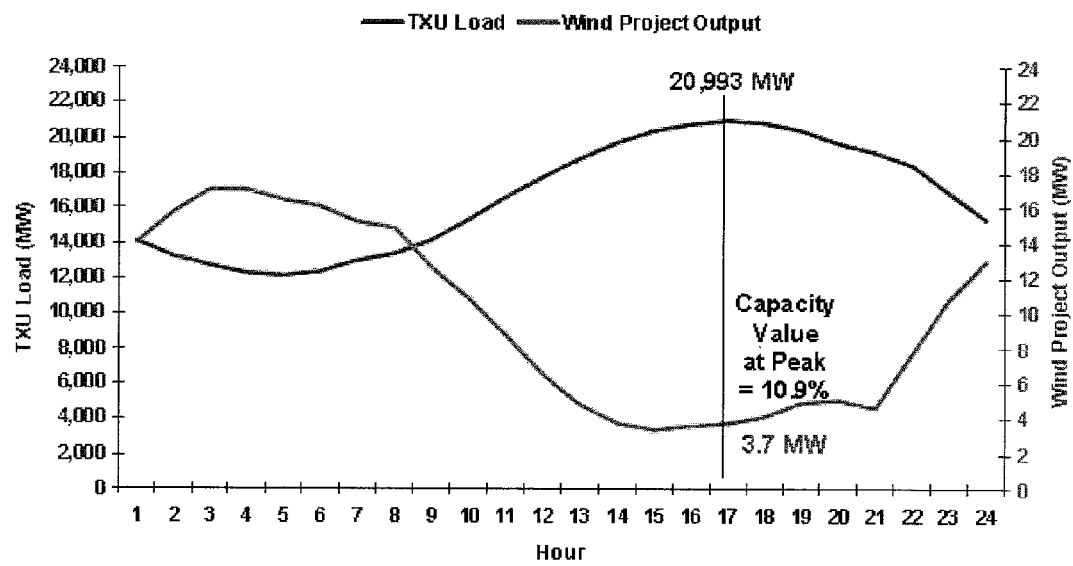
FIG. 7 depicts load for the State of Texas versus wind output for a twenty-four hour period.

FIG. 7 graphically represents wind project output, in a light gray line, and load, in a dark gray line for the State of Texas over a twenty-four hour period. These data suggest that output from an irregular and poorly controlled electric power source versus demand creates periods of excess energy and deficit energy.

Embodiments of the present method and apparatus capture the energy excess and store such energy for use in periods of energy deficit. The energy is stored in upgraded fossil fuels used in fossil fuel electric power sources.

Figure 8:
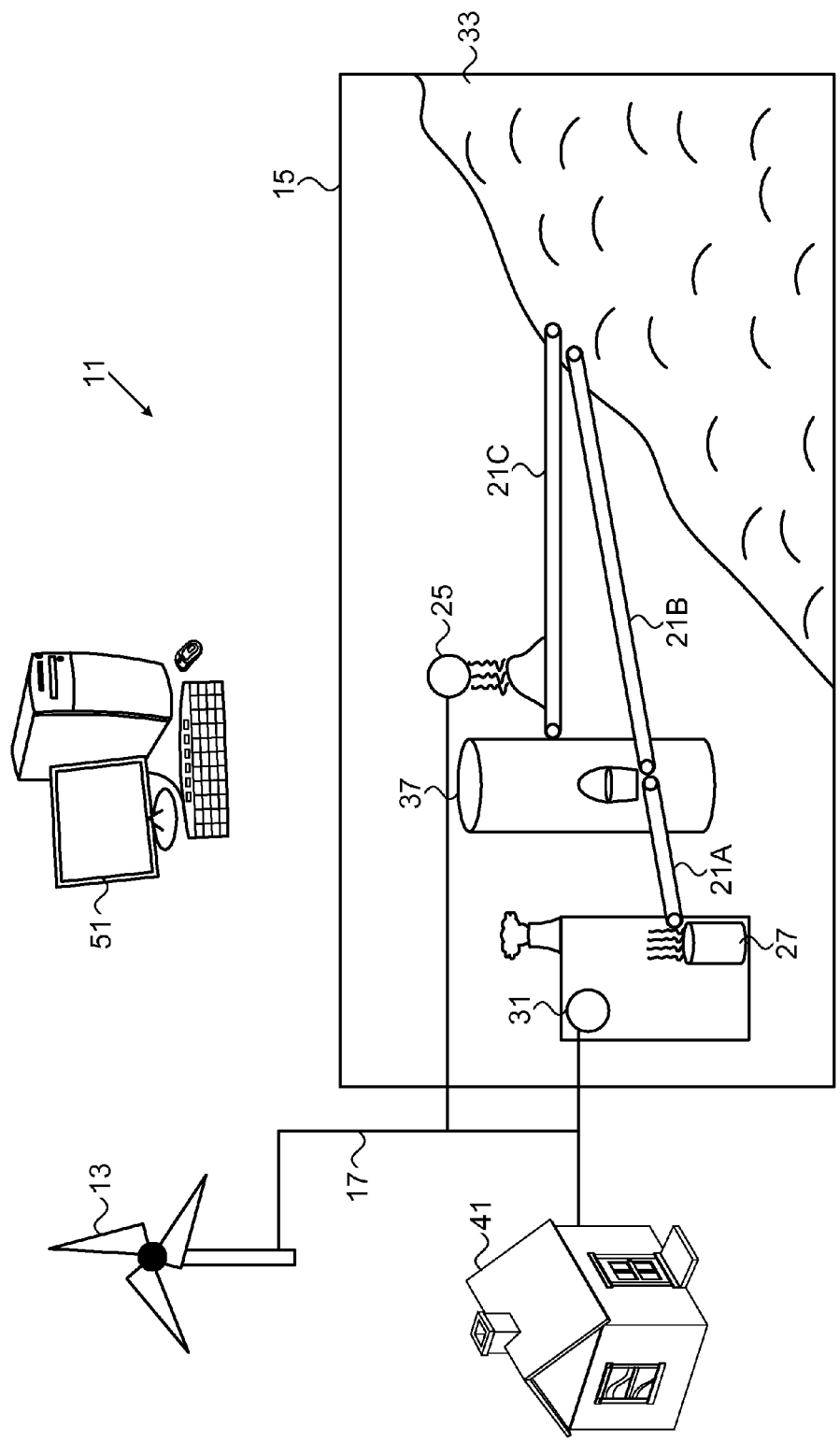
FIG. 8 is a schematic depiction of an apparatus embodying features of the present invention.

Turning now to FIG. 8, an apparatus, generally designated by the numeral 11, is depicted. Apparatus 11 is for generating electrical power for a power grid having periods of low demand and periods of high demand. The apparatus 11 has the following major elements: an irregular and poorly controlled electric power source 13 and a fossil fuel electric power source 15 in electrical communication through a power grid 17. The irregular and poorly controlled electric power source 13 depicted is a wind generator; however, the irregular and poorly controlled power source can be, in the alternative or in addition, a geothermal power source, a solar power source, or a wave or tidal power source [not shown].

The irregular and poorly controlled electric power source 13 has periods in which output does not correspond to demand, in which said demand exceeds capacity creating deficit periods, and periods of capacity exceeding demand creating excess periods as depicted in FIG. 2. The irregular and poorly controlled electric power source 13 is in electrical communication with the power grid 17 and, through the power grid or by separate transmission means [not shown], with the fossil fuel power source 15. As used herein, "separate transmission means" refers to power transmission lines which are not part of a larger grid.

The fossil fuel power source 15 is in electrical communication with the power grid 17 and, through the power grid 17 or by separate transmission means [not shown], is in electrical communication with the irregular and poorly controlled electrical power source 13. The fossil fuel electrical power source 15 has a conveying system 21 $a$, $b$ and $c$, a fossil fuel upgrading assembly 25, a burner 27, a generator 31, a source of lower grade fossil fuel 33, and a reserve 37.

The source of lower grade fossil fuel 33, as depicted, a pile or mound of low grade coal, is in communication with the conveying system, represented by coal conveying belts 21 $a$, $b$ and $c$. Low grade solid fossil fuel is selected from one or more of the group consisting of peat, low rank coal, ranks in between low rank coal and high rank coal, oil shale, and tar sand. A coal rated as a high rank coal can be processed to form a higher grade solid fossil fuel. The use of low rank coal or peat allows such less expensive, readily available, low energy forms of fossil fuels to be upgraded into high grade fossil fuel in a cost efficient and environmentally beneficial manner.

The conveying system 21 $a$, $b$ and $c$ receives the lower grade fossil fuel from the source of lower grade fossil fuel 33 and at least one higher grade fossil fuel from the reserve 37 or the fossil fuel upgrading assembly 25, and transports the lower grade fossil fuel and higher grade fossil fuel to the burner 27. The conveying system 21 $a$, $b$ and $c$ is depicted as a series of belts or conveyers. However, the conveying system may have many different configurations and elements. The conveying system may comprise rail cars, trucks, bucket vehicles and cranes, barges, ships, chutes and other mechanical mechanisms.

The fossil fuel upgrading assembly 25 receives a lower grade fossil fuel from the source 33 via conveying means 21 $a$, $b$ and $c$. The fossil fuel upgrading assembly 25 produces a higher grade fossil fuel, which upgraded fossil fuel is directed to the reserve 37 or conveying means 21 $a$, $b$ and $c$. The fossil fuel upgrading assembly 25 is in electrical communication with the irregular and poorly controlled electric power source 13 via the power grid 17 or by separate transmission means [not shown]. Fossil fuel upgrading assembly 25 receives power from the irregular and poorly controlled electric power source 13 during excess periods. The fossil fuel upgrading assembly 25 stores excess power in the form of an upgraded fossil fuel. The upgraded fossil fuel is used during deficit periods to produce thermal power in the burner 27.

The fossil fuel upgrading assembly 25, with respect to solid fossil fuels, performs one or more of the group of upgrades consisting of size reduction, drying, and removal of impurities. As depicted, fossil fuel upgrading assembly is an electromagnetic radiation device, such as a microwave radiation emitter, known in the art. Microwave radiation is used to remove water and impurities. Such impurities comprise mercury, iron, ash and sulfur. Fossil fuel upgrading assembly 25 having microwave emitters removes 8 percent or greater of the water content of low grade solid fuel. Fossil fuel upgrading assembly 25, in the alternative or in addition, may comprise grinders [not shown] for sizing solid fossil fuels, hot gas dryers [not shown] and other upgrading apparatus.

As depicted, reserve 37 is a container sized to at least one of the amount of higher grade fossil fuel selected from the group consisting of the amount anticipated to be produced during the excess periods or the amount anticipated to be used during the deficit periods. The container is purged or maintained with inert gases to prevent ignition.

The reserve 37 receives the higher grade fossil fuel during excess periods and releases the higher grade fossil fuel to the conveying system 21 *a, b* and *c* during deficit periods. Release of the higher grade fossil fuel allows the burner 27 to power the generator 31 in an efficient mode of operation. The generator 31 produces power for the power grid 17 with which it is in electrical communication.

As depicted in FIG. 8, the apparatus 11 has a control system 51 to monitor demand and output of the irregular and poorly controlled electric power source 13 to facilitate the integration and control of the output of the irregular and poorly controlled electric power source 13 with the power grid 17 and fossil fuel electric power source 15.

The control system 51 comprises computer processing units (CPUs) and memory and programming in the form of one or more computers, servers, and portable computing devices such as laptop computers, which are separate and distinct from other units and elements of the present apparatus, as shown, or are integral therewith [not shown].

The control system 51 is in signal communication with the irregular and poorly controlled power source 13, the power grid 17 and the fossil fuel upgrading assembly 25, and preferably the conveying system 21 *a, b* and *c*, reserve 37, and burner 27. For purposes of clarity, the aspects of signal communication are not shown. The control system 51 receives data from the power grid 17 as to demand and data from the irregular and poorly controlled power source 13 as to output. The control unit 51 compares the demand and output to make a determination as to at least one of the following: whether a excess period or deficit period is present, about to occur, or ending.

The determination is provided to operators of one or more of the irregular and poorly controlled power source 13, power grid 17, fossil fuel upgrading assembly 25 and fossil fuel electric power source 15, as a notice or directive to the operators or automated command signals to which it is in signal communication to: maintain operation of the fossil fuel upgrading assembly 25, switch to alternative power supplies [not shown], cease operation, or begin or prepare to begin operation of the fossil fuel upgrading assembly 25.

The directives can be acted on by the fossil fuel upgrading assembly 25 without further intervention, that is, in the nature of an automatic or robotic shifting of excess power from the irregular and poorly controlled power source 13 to the fossil fuel upgrading assembly 25 during excess periods, or away from the fossil fuel upgrading assembly 25 during deficit periods, or by directives or advisories to act issued to individual operators. One embodiment features the control system 51 in signal communication with the conveying system 21 *a, b* and *c* and reserve 37 to use upgraded fossil fuel during deficit periods.

The method of the present invention will be described with respect to a method of storing energy in an electric power grid 17 having a fossil fuel plant 15 and an irregular and poorly controlled electric power source 13 for generating electric power, and users capable of consuming the electric power. The users are represented by the house 41. The fossil fuel plant 15 is operable on low grade fossil fuel and high grade fossil fuel. The high grade fossil fuel has more energy per unit of mass than the low grade fossil fuel. The fossil fuel plant 15 is capable of variable output, having high output and low output, and consuming variable amounts of fossil fuel over time. The irregular and poorly controlled electric power source 13 has periods in which output does not correspond to demand.

In operation, the irregular and poorly controlled electric power source 13 has one or more periods of excess energy in which the irregular and poorly controlled electric power source 13 produces more power than demand, and one or more periods of deficit energy when the irregular and poorly electric power source 13 does not produce enough power for demand. The excess energy of the irregular and poorly controlled electric power source is used to power fossil fuel upgrading assembly 25 to process low grade fossil fuel and create a higher grade fossil fuel. The higher grade fossil fuel, with greater energy per unit of mass than said low grade fossil fuel, is stored in reserve 37. The fossil fuel plant 15 uses the high grade fossil fuel during the period of deficit energy to allow the fossil fuel plant to utilize stored energy from the irregular and poorly controlled electric power source 13.

Embodiments of the present method allow fossil fuel plants to operate at a substantially efficient level on the stored energy in the higher grade fossil fuel during periods of high demand. Thus, irregular and poorly controlled power sources 13 can have a greater benefit to the public by reducing emissions. Embodiments of the present invention allow for the continued use of existing fossil fuel power sources 15 in an environmentally advantageous manner.

Thus, the present invention has been described with respect to the preferred embodiments with the understanding that the subject matter of the present invention should not be limited to the precise details described and shown, but should encompass the subject matter recited in the claims that follow and their equivalents.

The invention claimed is:

1. The method of storing energy in a electric power grid having a fossil fuel plant and an irregular and poorly controlled electric power source for generating electric power, and users capable of consuming said electric power, and said fossil fuel plant is operable on low grade fossil fuel and high grade fossil fuel, said high grade fossil fuel having more energy per unit of mass than said low grade fossil fuel, said fossil fuel plant capable of variable output having high output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said irregular and poorly controlled electric power source is selected from the group consisting of solar power sources, wind power sources, tidal power sources, wave power sources, geothermal sources and combinations thereof.

2. The method of storing energy in an electric power grid having a fossil fuel plant and an irregular and poorly controlled electric power source for generating electric power, and users capable of consuming said electric power, and said fossil fuel plant is operable on low grade fossil fuel and high grade fossil fuel, said high grade fossil fuel having more energy per unit of mass than said low grade fossil fuel, said fossil fuel plant capable of variable output having high output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said fossil, fuel plant operates at a substantially efficient level on said stored energy in said higher grade fossil fuel during periods of high demand.

3. The method of storing energy in an electric power grid having a fossil fuel plant and an irregular and poorly controlled electric power source for generating electric power, and users capable of consuming said electric power, and said fossil fuel plant is operable on low grade fossil fuel and high grade fossil fuel, said high grade fossil fuel having more energy per unit of mass than said low grade fossil fuel, said fossil fuel plant capable of variable output haying high output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said low grade fossil fuel is processed by electromagnetic radiation to produce a higher grade fossil fuel.

4. The method of claim 3 wherein said electromagnetic radiation is microwave radiation.

5. The method of storing energy in an electric power grid having a fossil fuel plant and an irregular and poorly controlled electric power source for generating electric power, and users capable of consuming said electric power, and said fossil fuel plant is operable on low grade fossil fuel and high grade fossil fuel, said high grade fossil fuel having more energy per unit of mass than said low grade fossil fuel, said fossil fuel plant capable of variable output having high. output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said step of storing creates a reserve of higher grade fossil fuel in an amount to allow said fossil fuel plant to substantially continue at an efficient level of operation during said period of deficit power on said higher grade fossil fuel.

6. The method of claim 5 wherein said periods of excess power and periods of deficit power are cyclical over a day.

7. The method of claim 6 wherein said reserve is sized to at least one of the amount of higher grade fossil fuel selected from the group consisting of the amount anticipated to be produced during said period of excess energy or said amount anticipated to be used during said period of deficit power.

8. The method of claim 5 wherein said reserve is maintained in a container to maintain the higher grade fossil fuel.

9. The method of storing energy in an electric power grid having a fossil fuel plant and an irregular and poorly controlled electric power source for generating electric power, and users capable of consuming said electric power, and. said fossil fuel plant is operable on low grade fossil fuel and high grade fossil fuel, said high grade fossil fuel having more energy per unit of mass than said low grade fossil fuel, said fossil fuel plant capable of variable output having high. output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said fossil fuel is upgraded to remove at least 8% of the water content.

10. The method of storing energy in an electric power grid having a fossil fuel plant and an irregular and poorly controlled electric power source for generating electric power, and users capable of consuming said electric power, and said fossil fuel plant is operable on low grade fossil fuel and high grade fossil fuel, said high grade fossil fuel having more energy per unit of mass than said low grade fossil fuel, said fossil fuel plant capable of variable output having high output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said low grade fossil fuel and said higher grade fossil fuel is selected from one or more of the group consisting of peat, low rank coal, high rank coal, and ranks in between, oil shale, and tar sand.

11. The method of storing energy in an electric power grid having a fossil fuel plant and an irregular and poorly controlled electric power source for generating electric power, and users capable of consuming said electric power, and. said fossil fuel plant is operable on low grade fossil, fuel and high grade fossil fuel, said high grade fossil fuel having more energy per unit of mass than said low grade fossil fuel, said fossil fuel plant capable of variable output having high output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand.;

b. using said excess energy to power fossil fuel upgrading assembly to process low grade fossil fuel and create a higher grade fossil fuel, and storing said higher grade fossil fuel with greater energy per unit of mass than said low grade fossil fuel; and c. operating said fossil fuel plant on high grade fossil fuel during said period of deficit energy to allow said fossil fuel plant to utilize stored energy from said variable electric power source in said higher grade fossil fuel;

wherein said processing to said higher grade fossil fuel removes one or more impurities.

12. The method of claim 11 wherein said impurities comprise at least one of the compositions of the group consisting of sulfur, ash, iron, and mercury.

13. The method of storing energy in an electric power grid having a fossil fuel plant and an irregular and poorly controlled electric power source for generating electric power, and users capable of consuming said electric power, and said fossil fuel plant is operable on low grade fossil fuel and high grade fossil fuel, said high grade fossil fuel having more energy per unit of mass than said low grade fossil fuel, said fossil fuel plant capable of variable output having high output and low output and consuming variable amounts of fossil fuel in a period, and said irregular and poorly controlled electric power source having periods in which output does not correspond to demand, said method comprising the steps of:

a. operating said irregular and poorly controlled electric power source to create one or more periods of excess energy in which the variable electric power source produces more power than demand and one or more periods of deficit energy when said variable electric power source does not produce enough power for demand;

b. using said excess energy to power fossil fuel upgrading assembly to process low grade fossil fuel and create a higher grade fossil fuel, and storing said higher grade fossil fuel with greater energy per unit of mass than said low grace fossil fuel; and operating said fossil fuel plant on high grade fossil fuel during said period of deficit energy to allow said fossil fuel plant to utilize stored energy from said variable electric power source in said higher grade fossil fuel;

wherein said processing comprises drying in hot gases.

14. An apparatus for generating electrical power for a power grid having periods of low demand and periods of high demand, comprising:

a. an irregular and poorly controlled electric power source, said irregular and poorly controlled electric power source having periods in which output does not correspond to demand in which said demand exceeds capacity creating deficit periods and periods of capacity exceeding demand creating excess periods, said irregular and poorly controlled electric power source in electrical communication with said power grid and through said power grid or by separate transmission means, with said fossil fuel power source;

b. a fossil fuel electric power source for producing electrical power, said fossil fuel power source in electrical communication with said power grid and, through said power grid or by separate transmission means, in electrical communication with said irregular and poorly controlled electrical power source, said fossil fuel electrical power source having a conveying system, a fossil fuel upgrading assembly, a burner, a generator, a source of lower grade fossil fuel, and a reserve, said source of lower grade fossil fuel in communication with a conveying system, said conveying system for receiving said lower grade fossil fuel from said source and at least one higher grade fossil fuel from a reserve or said fossil fuel upgrading assembly and transporting said lower grade fossil fuel and higher grade fossil fuel to said burner, said fossil fuel upgrading system using power and receiving a lower grade fossil fuel from said source and producing a higher grade fossil fuel which upgraded fossil fuel is directed to said reserve or conveying means, a burner in communication with said conveying system for consuming said lower grade fossil fuel and said higher grade fossil fuel, said burner powering said generator, said generator producing power for the power grid; and c. wherein said power from said irregular and poorly controlled electric power source during excess periods is used by the fossil fuel upgrading assembly to store excess power in the form of an upgraded fossil fuel and said upgraded fossil fuel is used during deficit periods to produce power.

15. The apparatus of claim 14 wherein said reserve is sized to at least one of the amounts of higher grade fossil fuel selected from the group consisting of the amount anticipated to be produced during said excess periods or said amount anticipated to be used during said deficit periods.

16. The apparatus of claim 14 wherein said reserve receives said higher grade fossil fuel during excess periods and releases said higher grade fossil fuel to said conveying system during deficit periods to allow the burner and generator to operate in an efficient mode of operation.

17. The apparatus of claim 14 wherein said reserve is a container.

18. The apparatus of claim 17 wherein said container is purged or maintained with inert gases to prevent ignition.

19. The apparatus of claim 14 wherein said fossil fuel upgrading assembly performs one or more of the group of upgrades consisting of size reduction, drying, and removal of impurities.

20. The apparatus of claim 19 wherein said fossil fuel upgrading assembly comprises electromagnetic radiation.

21. The apparatus of claim 20 wherein said electromagnetic radiation is microwave radiation.

22. The apparatus of claim 14 wherein excess periods and deficit periods are cyclical over a period of time.

23. The apparatus of claim 22 wherein said period of time is a day.

24. The apparatus of claim 14 further comprising control systems to monitor demand and output of the irregular and poorly controlled electric power source.

25. The apparatus of claim 24 wherein said control system is in signal communication with the irregular and poorly controlled power source, the power grid and the fossil fuel upgrading assembly.

26. The apparatus of claim 24 wherein said control system receives data from the power grid as to demand and data from the irregular and poorly controlled power source as to output and compares the demand and output to make a determination as to at least one of the following: whether a excess period or deficit period is present, about to occur, or ending.

27. The apparatus of claim 26 wherein the determination is provided to operators of one or more of the irregular and poorly controlled power source, power grid and fossil fuel upgrading assembly as a notice to maintain operation of the fossil fuel upgrading assembly, switch to alternative power supplies, cease operation, or begin or prepare to begin operation of the fossil fuel upgrading assembly.

28. The apparatus of claim 26 wherein the control system shifts excess power from the irregular and poorly controlled power source to the fossil fuel upgrading assembly during excess periods.

29. The apparatus of claim 26 wherein the control system is in signal communication with the conveying system and reserve and directs the reserve to release and the conveying system to convey said upgraded fossil fuel for use during deficit periods.

* * * * *